United States Patent
Yu et al.

(10) Patent No.: US 11,226,198 B2
(45) Date of Patent: Jan. 18, 2022

(54) THREE-DIMENSIONAL SCANNING SYSTEM

(71) Applicant: BENANO INC., Taipei (TW)

(72) Inventors: Liang-Pin Yu, Taipei (TW);
Yeong-Feng Wang, Taipei (TW);
Chun-Di Chen, Taipei (TW); Yun-Ping Kuan, Taipei (TW)

(73) Assignee: BENANO INC., Taipei (TW)

( * ) Notice: Subject to any disclaimer, the term of this patent is extended or adjusted under 35 U.S.C. 154(b) by 0 days.

(21) Appl. No.: 16/234,404

(22) Filed: Dec. 27, 2018

(65) Prior Publication Data
US 2020/0056882 A1 Feb. 20, 2020

(30) Foreign Application Priority Data
Aug. 17, 2018 (TW) .................. 107128888

(51) Int. Cl.
*G01B 11/25* (2006.01)
*G06T 7/521* (2017.01)

(52) U.S. Cl.
CPC .......... *G01B 11/2518* (2013.01); *G06T 7/521* (2017.01); *G06T 2207/10152* (2013.01)

(58) Field of Classification Search
CPC ... G01B 11/167; G01B 11/2518; G06T 7/521; G06T 2207/10152
See application file for complete search history.

(56) References Cited

U.S. PATENT DOCUMENTS

| | | | |
|---|---|---|---|
| 6,219,461 B1* | 4/2001 | Wallack | G01B 11/22 382/106 |
| 7,440,590 B1* | 10/2008 | Hassebrook | G01B 11/2513 345/582 |
| 8,280,152 B2* | 10/2012 | Thiel | A61B 5/0064 382/154 |
| 10,593,055 B2* | 3/2020 | Wang | G01B 11/2513 |
| 2009/0322859 A1* | 12/2009 | Shelton | G01B 11/2513 348/46 |
| 2015/0109423 A1* | 4/2015 | Shimodaira | H04N 13/254 348/49 |
| 2016/0080634 A1* | 3/2016 | Hamano | H04N 5/232123 348/349 |

(Continued)

FOREIGN PATENT DOCUMENTS

| JP | H0921620 A | 1/1997 |
|---|---|---|
| JP | 2011007744 A | 1/2011 |

(Continued)

*Primary Examiner* — Kyle M Lotfi
(74) *Attorney, Agent, or Firm* — Innovation Capital Law Group, LLP; Vic Lin

(57) ABSTRACT

A three-dimensional scanning system includes a projection light source, an image capturing apparatus, and a signal processing apparatus. The projection light source is configured to project a two-dimensional light to a target, where the two-dimensional light has a spatial frequency. The image capturing apparatus captures an image of the target illuminated with the two-dimensional light. The signal processing apparatus is coupled to the projection light source and the image capturing apparatus, to analyze a definition of the image of the two-dimensional light, where if the definition of the image of the two-dimensional light is lower than a requirement standard, the spatial frequency of the two-dimensional light is reduced.

6 Claims, 6 Drawing Sheets

(56) References Cited

U.S. PATENT DOCUMENTS

| | | | | |
|---|---|---|---|---|
| 2017/0134717 | A1* | 5/2017 | Trail | H04N 13/128 |
| 2019/0146313 | A1* | 5/2019 | De La Cruz | H04N 9/3194 |
| | | | | 345/581 |
| 2019/0261843 | A1* | 8/2019 | Guan | A61B 1/24 |

FOREIGN PATENT DOCUMENTS

| | | |
|---|---|---|
| KR | 20130023244 A | 3/2013 |
| KR | 101705762 B1 | 2/2017 |

* cited by examiner

THREE-DIMENSIONAL SCANNING SYSTEM

CROSS-REFERENCE TO RELATED APPLICATION

This non-provisional application claims priority under 35 U.S.C. § 119(a) to Patent Application No. 107128888 filed in Taiwan, R.O.C. on Aug. 17, 2018, the entire contents of which are hereby incorporated by reference.

BACKGROUND

Technical Field

The present invention relates to a scanning system, and in particular, to a three-dimensional scanning system.

Related Art

Three-dimensional scanning is mainly used to scan a target to obtain surface space coordinates of the target, and is the main manner of current three-dimensional modeling. Three-dimensional scanning manners may include a contact type and a non-contact type, and the non-contact type is most widely used. In non-contact type optical measurement, the attribute of depth of field of a lens usually leads to limitation to a scanning range. To overcome this limitation, for three-dimensional scanning of a relatively large target, some people take the manner of segmented scanning. However, a subsequent action of splicing results after scanning is added to this manner. In addition, if a material that easily reflects light is provided on a surface of the target, interference is easily caused to three-dimensional scanning.

SUMMARY

In view of this, the present invention provides a three-dimensional scanning system, including a projection light source, an image capturing apparatus, and a signal processing apparatus. The projection light source is configured to project a two-dimensional light to a target, where the two-dimensional light has a spatial frequency. The image capturing apparatus captures an image of the target illuminated with the two-dimensional light. The signal processing apparatus is coupled to the projection light source and the image capturing apparatus, to analyze a definition of the image, where if the definition of the image is lower than a requirement standard, the spatial frequency of the two-dimensional light is reduced.

The present invention further provides a three-dimensional scanning system, including a projection light source, an image capturing apparatus, and a signal processing apparatus. The projection light source is configured to project a two-dimensional light to a target, where the two-dimensional light is converted from a first pattern into a second pattern with time. The image capturing apparatus separately captures a first image of the target illuminated with the first pattern and a second image of the target illuminated with the second pattern. The signal processing apparatus is coupled to the projection light source and the image capturing apparatus, and alternately refers to the first image and the second image to generate a three-dimensional model.

In conclusion, according to the three-dimensional scanning system provided in the embodiments of the present invention, the spatial frequency of the two-dimensional light can be adjusted depending on requirements, to improve the definition of the obtained image, and the three-dimensional scanning system can be adapted to scan targets of different heights. In addition, by projecting the two-dimensional light with different pattern features, a target that easily reflects light can be scanned.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
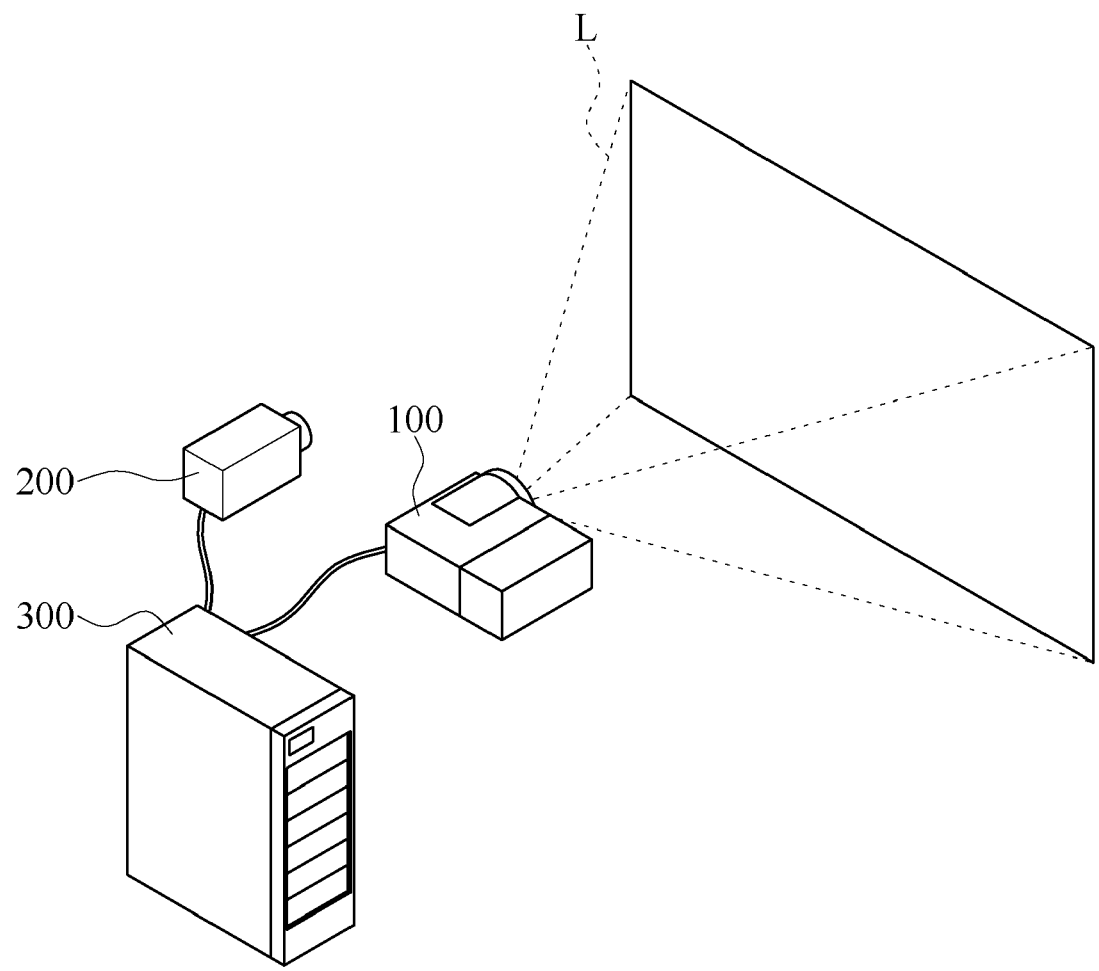
FIG. 1 is a schematic diagram of a three-dimensional scanning system according to an embodiment of the present invention.

Referring to FIG. 1, FIG. 1 is a schematic diagram of a three-dimensional scanning system according to an embodiment of the present invention. The three-dimensional scanning system includes a projection light source 100, an image capturing apparatus 200, and a signal processing apparatus 300.

The projection light source 100 is configured to project a two-dimensional light L to a target (not shown). The projection light source 100 may include one or more projection apparatuses. The two-dimensional light L refers to a light that can be projected on a two-dimensional space to form an illumination range. The two-dimensional light L has a spatial frequency (or referred to as a spatial resolution). That is, the two-dimensional light L includes a same geometric structure that repeatedly appears per unit of length, and the repetition frequency is the spatial frequency. As shown in FIG. 1, the two-dimensional light L can be projected on a plane to form a quadrangular illumination range, and repeated bright and dark stripes appear within this quadrangular illumination range.

The image capturing apparatus 200 may capture an image of the target illuminated with the two-dimensional light L. The image capturing apparatus 200 may include one or more camera lens, and the camera lens may be a charge coupled device (CCD) or complementary metal-oxide semiconductor (CMOS) image sensor.

One or more projection apparatuses and one or more image capturing apparatuses 200 may be scheduled to cooperate with each other for operation. For example, when the projection light source 100 includes two projection apparatuses, when a first projection apparatus outputs the two-dimensional light L, one or more camera lenses synchronously capture an image, and when a second projection apparatus outputs another two-dimensional light L, the one or more camera lenses synchronously capture the image.

The signal processing apparatus 300 is coupled to the projection light source 100 and the image capturing apparatus 200, for controlling the projection light source 100 and obtaining the foregoing image, to analyze the image, and to deduce depth information based on the image by using a triangulation ranging principle, thereby generating a three-dimensional model of the target based on the depth information. The signal processing apparatus 300 may be a computer apparatus having a computing capability, for example, a computer, which includes a processor configured to execute the foregoing calculation, an electronic device such as a storage medium storing the calculation program code, a memory, and the like.

Figure 2:
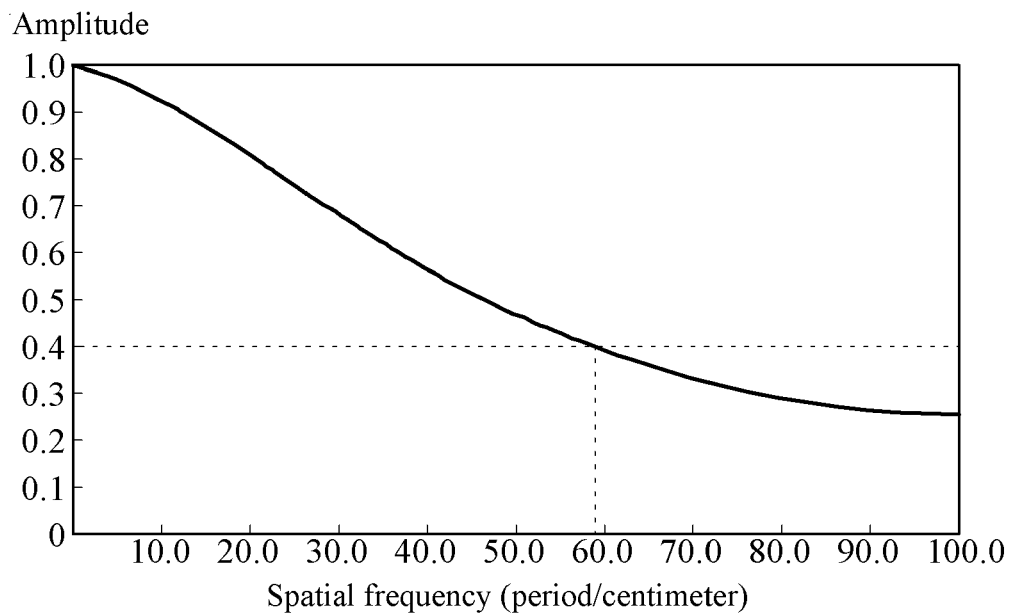
FIG. 2 is a diagram of a modulation transfer function (MTF) when a projection light source is in a focal plane.
Figure 3:
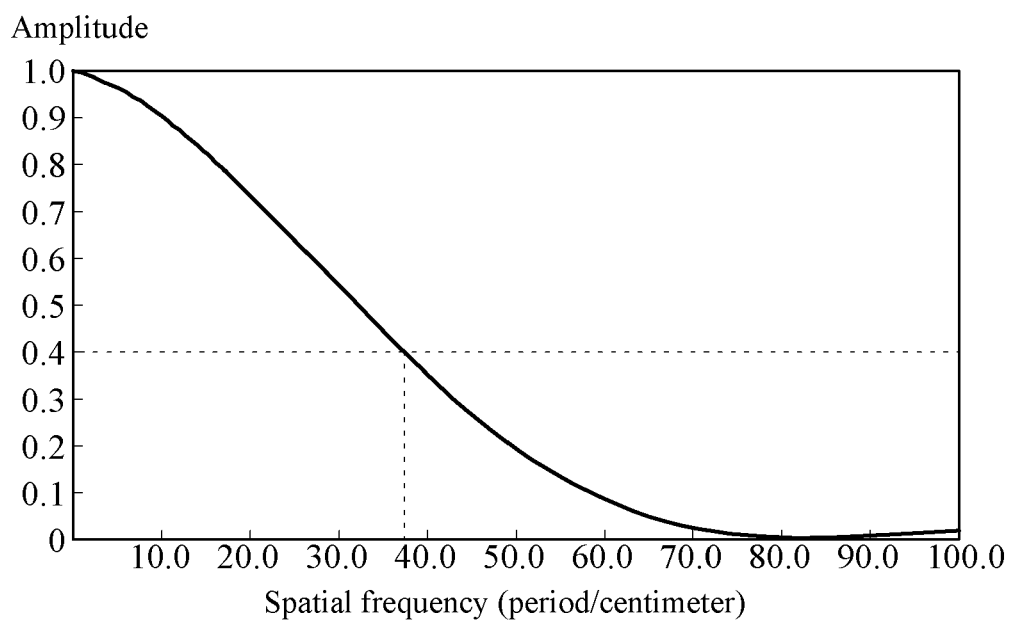
FIG. 3 is a diagram of an MTF when a projection light source is positioned at 1 centimeter on the proximal side of the focal plane.
Figure 4:
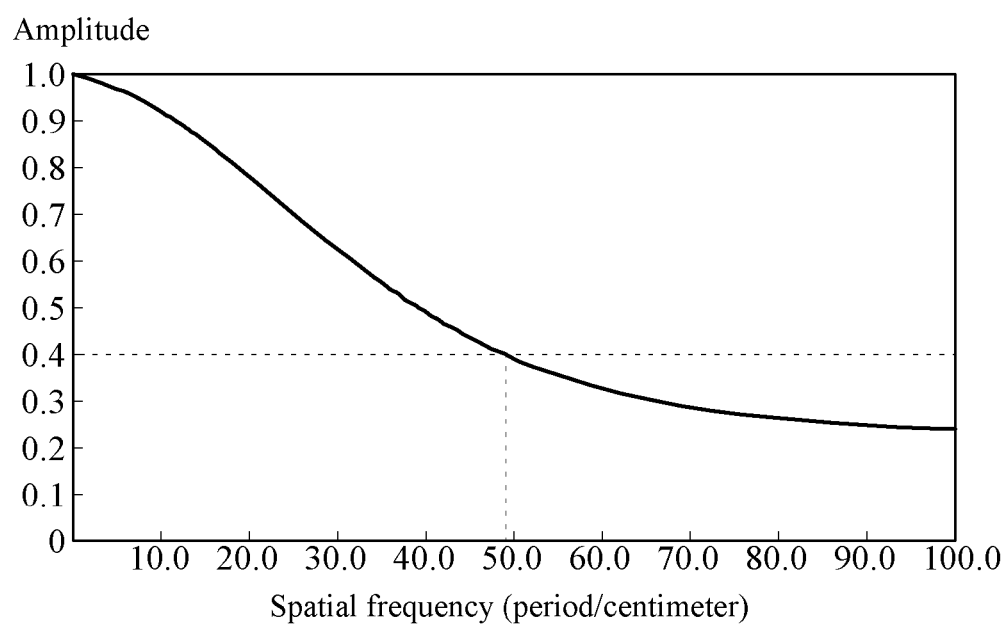
FIG. 4 is a diagram of an MTF when a projection light source is positioned at 1 centimeter on the distal side of the focal plane.

Referring to FIG. 2 to FIG. 4, a lens whose focal length is 50 millimeters, whose aperture is F/4, and whose magnification is −0.3× is used as an example. FIG. 2 is a diagram of an MTF when the projection light source 100 is in a focal plane. FIG. 3 is a diagram of an MTF when the projection light source 100 is defocused by a distance of approximately 1 centimeter proximal of the target, relative to the focal plane. FIG. 4 is a diagram of an MTF when the projection light source 100 is defocused by a distance of 1 centimeter distal the target, relative to the focal plane. It can be seen that a higher spatial frequency indicates a higher vulnerability of the definition of the image to the defocus distance.

Figure 5:
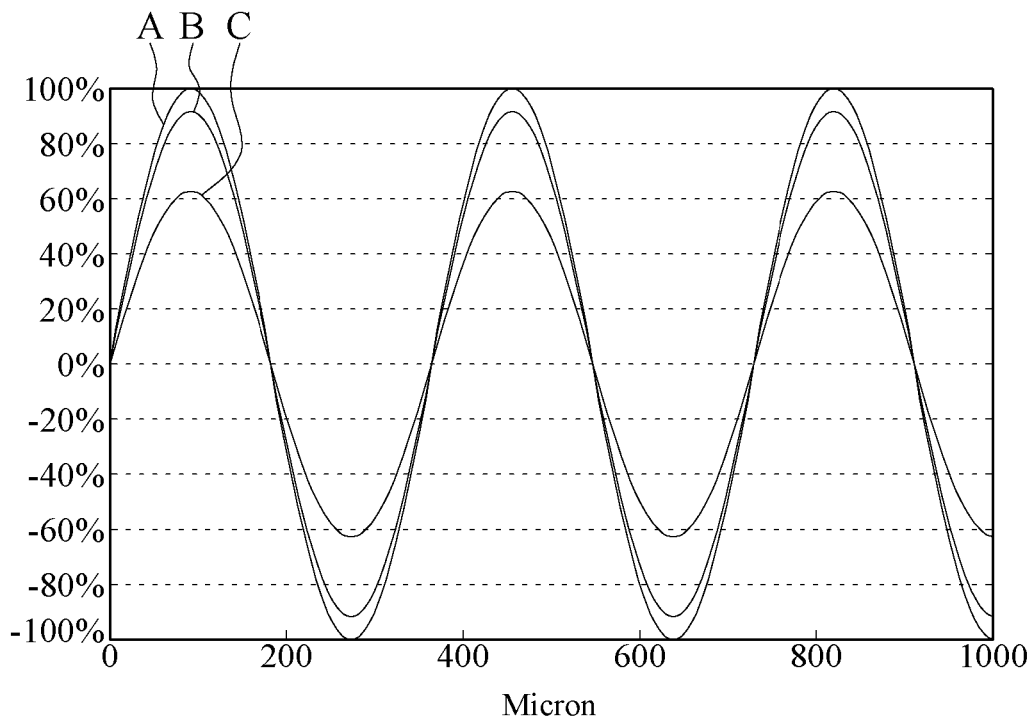
FIG. 5 is a measurement result (1) with different spatial frequencies at different positions.
Figure 6:
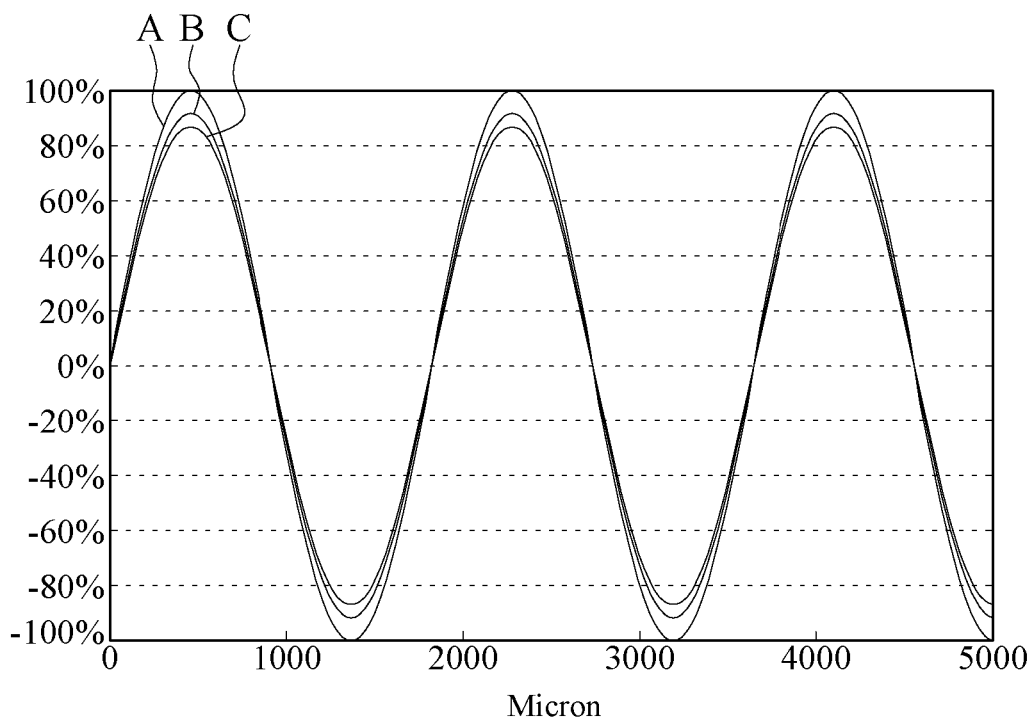
FIG. 6 is a measurement result (2) with different spatial frequencies at different positions.
Figure 7:
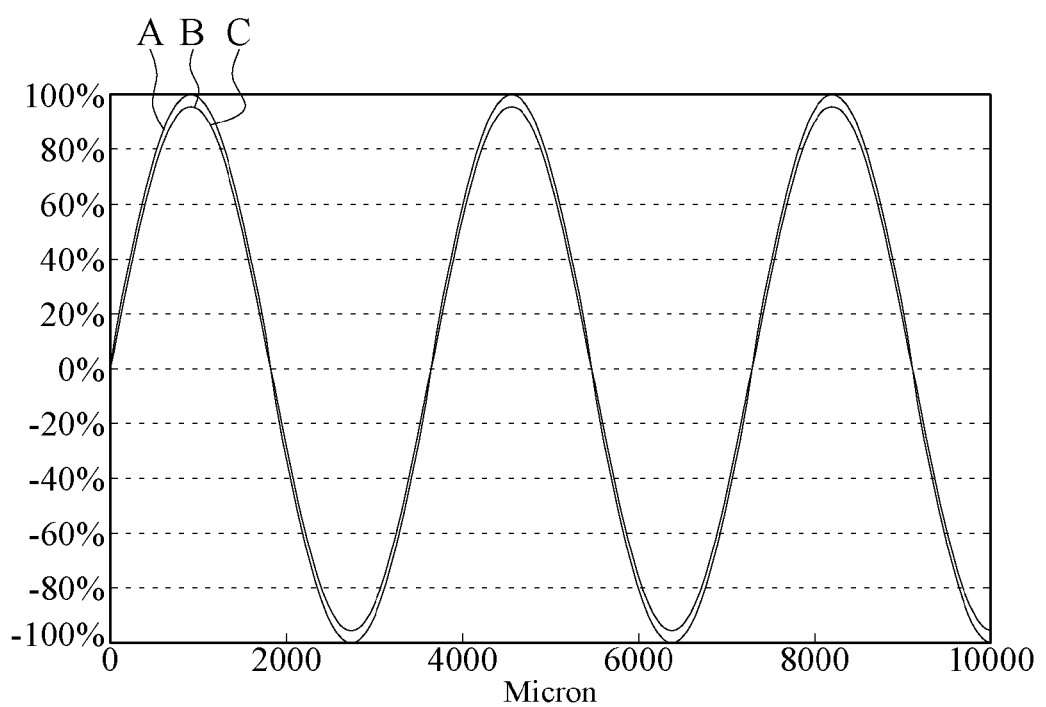
FIG. 7 is a measurement result (3) with different spatial frequencies at different positions.

Referring to FIG. 5 to FIG. 7, FIG. 5 to FIG. 7 respectively show measurement results with different spatial frequencies at different positions. When a sinusoidal signal is input into the projection light source 100 for output, the projection light source 100 is enabled to output the bright and dark two-dimensional light L. As shown in FIG. 5, a line A is a measurement result when the projection light source is in the focal plane, a line B is a measurement result when a distance between the focal plane and the projection light source is 5 centimeters, and a line C is a measurement result when the distance between the focal plane and the projection light source is 10 centimeters. The longitudinal axis is a measured signal amplitude (herein a value on which normalization is performed, and therefore presented in a percentage form), and the horizontal axis is a space length. It can be seen that when the spatial frequency is relatively high, a longer distance between the focal plane and the projection light source indicates a less clear measured image. Then by comparing FIG. 5 with FIG. 6 and FIG. 7, it can be seen that when the spatial frequency is reduced, a sufficiently clear image can be measured even if the projection light source is located at a position deviating from the focal plane.

It can be learned according to the foregoing measurement results that, by reducing the spatial frequency, a measurement range can be converted from fuzziness to a high definition to be identifiable. Therefore, after obtaining the image captured by the image capturing apparatus 200, the signal processing apparatus 300 first analyzes the definition of the image. If the definition of the image is lower than a requirement standard, the spatial frequency of the two-dimensional light L is reduced, to improve the definition of the image. In some embodiments, the signal processing apparatus 300 voluntarily reduces the spatial frequency, and then detects whether the image after spatial frequency reduction meets the requirement standard, and if the image after spatial frequency still fails to meet the requirement standard, the signal processing apparatus 300 reduces the spatial frequency again. In some embodiments, an operator operates the signal processing apparatus 300 to specify a drop-out value of the spatial frequency.

In some embodiments, the spatial frequency of the two-dimensional light L is maintained at a single frequency.

Figure 8:
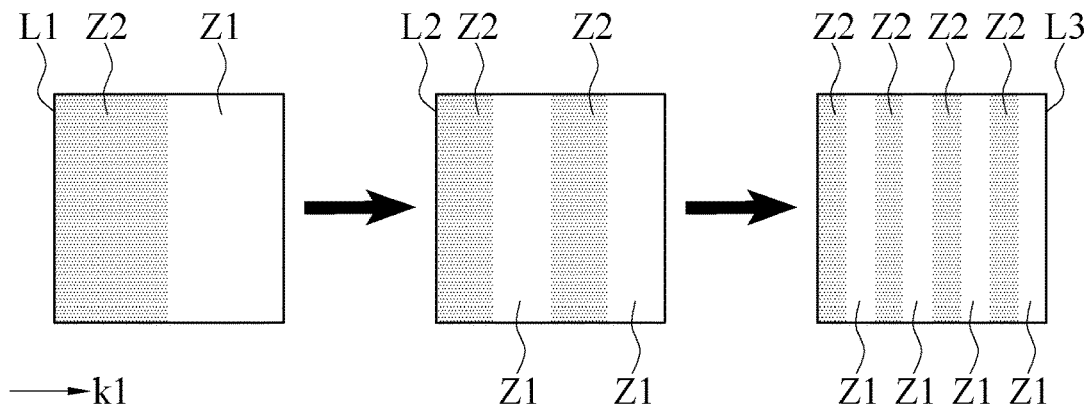
FIG. 8 is a schematic diagram of a frequency combination according to an embodiment of the present invention.

In some embodiments, the spatial frequency of the two-dimensional light L is variable, and is a frequency combination. The frequency combination is different spatial frequencies that vary with time. Referring to FIG. 8, FIG. 8 is a schematic diagram of a frequency combination according to an embodiment of the present invention. It is indicated herein that the two-dimensional light L may be sequentially changed from a two-dimensional light L1 formed by a bright zone Z1 and a dark zone Z2 into a two-dimensional light L2 formed by alternating two bright zones Z1 and two dark zones Z2, and then changed into a two-dimensional light L3 formed by alternating four bright zones Z1 and four dark zones Z2. In this way, space coding may be performed on an illumination range, to track each position within the illumination range. Herein, junctions between the bright and dark zones may be clear or gradual.

In some embodiments, the two-dimensional light L of different spatial frequencies may be sequentially output, and corresponding images are captured by using the image capturing apparatus 200. The signal processing apparatus 300 voluntarily selects an image of a suitable spatial frequency from the captured images. For example, for a target having different heights, because a part at a relatively high position is defocused, an image of a highest spatial frequency is not used.

Figure 9:
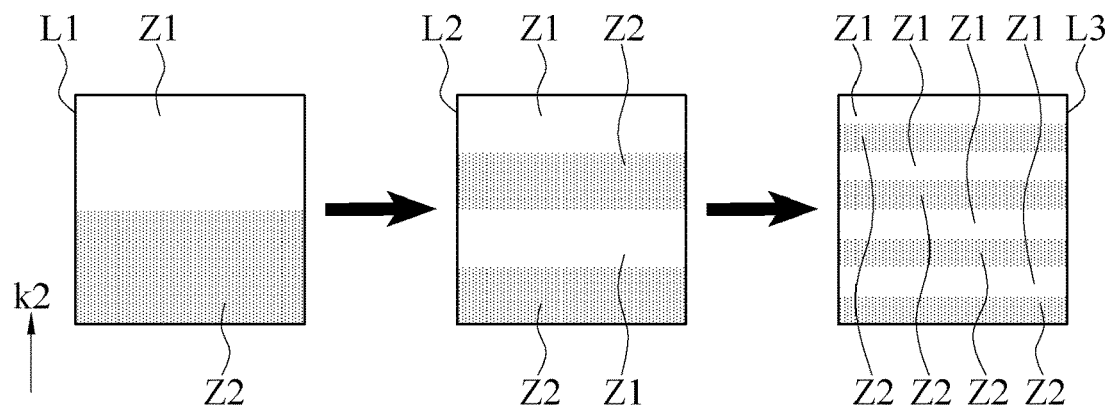
FIG. 9 is a schematic diagram of a frequency combination according to another embodiment of the present invention.

FIG. 9 is a schematic diagram of a frequency combination according to another embodiment of the present invention. Comparing FIG. 9 with FIG. 8, the pattern in FIG. 8 is generated in a manner of emitting light at intervals in a first direction k1, and the pattern in FIG. 9 is generated in a manner of emitting light at intervals in a second direction k2.

In some cases, a highly light-reflective material may be provided on a surface of the target and easily affects a result of a triangulation ranging algorithm. Therefore, in some embodiments, the two-dimensional light is converted from a first pattern into a second pattern with time. For example, the first pattern is bright and dark patterns that have a spatial frequency and that are generated in a manner of emitting light at intervals in the first direction k1, as shown in FIG. 8, and the second pattern is bright and dark patterns that have a spatial frequency and that are generated in a manner of emitting light at intervals in the second direction k2, as shown in FIG. 9. The spatial frequency of the first pattern may be the same as that of the second pattern, but this embodiment of the present invention is not limited thereto. The image capturing apparatus 200 separately captures a first image of the target illuminated with the first pattern and a second image of the target illuminated with the second pattern. The signal processing apparatus 300 alternately refers to the first image and the second image, and compares calculation results corresponding to a same position of the target in the two images; if the results are different, the different results are removed, and only substantively same or similar calculation results are kept, and a missing part may be complemented by using a interpolation method, to generate a three-dimensional model.

In some embodiments, the spatial frequency of the first pattern is different from that of the second pattern.

Figure 10:
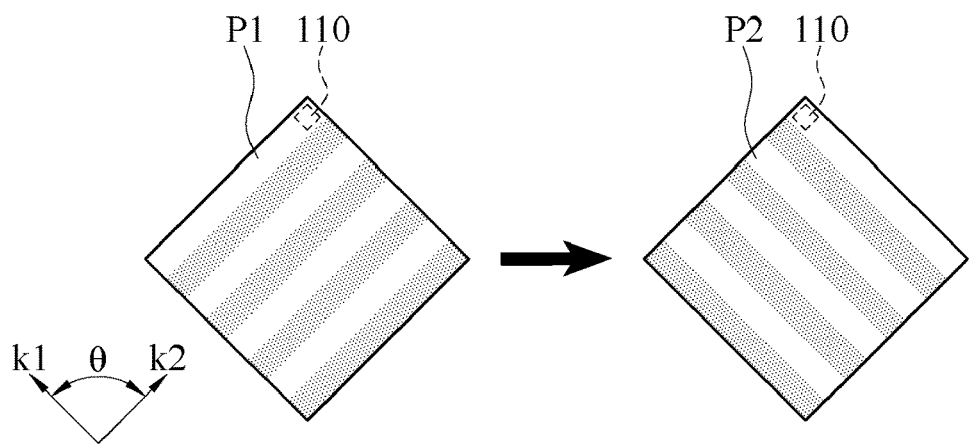
FIG. 10 is a schematic diagram of a first pattern and a second pattern according to another embodiment of the present invention.

Referring to FIG. 10, FIG. 10 is a schematic diagram of a first pattern P1 and a second pattern P2 according to another embodiment of the present invention. It should be noted therein that the foregoing first direction k1 and second direction k2 are not necessarily vertical and horizontal directions. The first direction k1 and the second direction k2 may also be other directions, for example, ±45 degrees. However, the present invention does not limit that an angle θ between the first direction k1 and the second direction k2 is necessarily 90 degrees, and the angle θ may also be another angle. That is, the angle θ between the first direction k1 and the second direction k2 is within a range from 0 degrees to 180 degrees, and is not 0 degrees, 90 degrees, or 180 degrees. In other words, in some embodiments, the projection light source 100 includes a plurality of light emitting units 110 arranged in a two-dimensional manner, and the light emitting units 110 may be of a shape of a quadrate, or another shape, for example, a rhombus. Herein, directions of and the angle between the first direction k1 and the second direction k2 refer to directions of and the angle between the first direction k1 and the second direction k2 of the two-dimensional light output by the projection light source 100 on a light emitting surface.

In conclusion, according to the three-dimensional scanning system provided in the embodiments of the present invention, the spatial frequency of the two-dimensional light L can be adjusted depending on requirements, to improve the definition of the obtained image, and the three-dimensional scanning system can be adapted to scan targets of different heights. In addition, by projecting the two-dimensional light with different pattern features, a target that easily reflects light can be scanned.

What is claimed is:

1. A three-dimensional scanning system, comprising:
    a projection light source, configured to project a two-dimensional light to a target, wherein the two-dimensional light has a spatial frequency;
    an image capturing apparatus, configured to capture an image of the target illuminated with the two-dimensional light; and
    a signal processing apparatus, coupled to the projection light source and the image capturing apparatus, to analyze a defocused definition of the image, wherein the defocused definition of the image is determined by determining an amplitude of a modulation transfer function (MTF) at a distance between the target and the projection light source, wherein if the amplitude of the MTF is lower than a requirement standard, the spatial frequency of the two-dimensional light is reduced in an operating range to improve the amplitude.

2. The three-dimensional scanning system according to claim 1, wherein the spatial frequency of the two-dimensional light is a single frequency.

3. The three-dimensional scanning system according to claim 1, wherein the spatial frequency of the two-dimensional light is a frequency combination, and the frequency combination is different spatial frequencies that vary with time.

4. The three-dimensional scanning system according to claim 1, wherein the two-dimensional light is converted from a first pattern into a second pattern with time, and the image capturing apparatus separately captures a first image of the target illuminated with the first pattern and a second image of the target illuminated with the second pattern, and the signal processing apparatus alternately refers to the first image and the second image to generate a three-dimensional model.

5. The three-dimensional scanning system according to claim 4, wherein the projection light source has a light emitting unit arranged in a two-dimensional manner, the first pattern is generated in a manner of emitting light at intervals in a first direction, and the second pattern is generated in a manner of emitting light at intervals in a second direction.

6. The three-dimensional scanning system according to claim 1, wherein the MTF of the projection light source is defocused by a distance proximate the target is different from the MTF of the projection light source defocused by the distance distal the target.

\* \* \* \* \*